United States Patent [19]
Bernstein et al.

[11] Patent Number: 5,420,780
[45] Date of Patent: May 30, 1995

[54] APPARATUS FOR LIMITING INRUSH CURRENT

[75] Inventors: Avi Bernstein; Igor Mogilevski, both of Northridge, Calif.

[73] Assignee: Omega Power Systems, Chatsworth, Calif.

[21] Appl. No.: 176,085

[22] Filed: Dec. 30, 1993

[51] Int. Cl.6 ............................................. H02M 5/42
[52] U.S. Cl. ...................................... 363/89; 323/908
[58] Field of Search ....................... 363/16, 20, 21, 49, 363/52, 53, 84, 89, 97, 131; 323/222, 223, 282, 284, 908

[56] References Cited

U.S. PATENT DOCUMENTS

| | | | |
|---|---|---|---|
| 3,947,751 | 3/1976 | Bray | 323/9 |
| 4,307,440 | 12/1981 | Inoue et al. | 363/15 |
| 4,396,882 | 8/1983 | Kellenbenz | 323/278 |
| 4,628,431 | 9/1986 | Kayser | 363/49 |
| 4,719,552 | 1/1988 | Albach et al. | 363/89 |
| 4,719,553 | 1/1988 | Hinckley | 363/49 |
| 4,800,329 | 1/1989 | Masaki | 323/908 |
| 4,864,482 | 9/1989 | Quazi et al. | 363/37 |
| 5,111,058 | 5/1992 | Martin | 307/66 |
| 5,122,724 | 6/1992 | Criss | 323/222 |
| 5,287,263 | 2/1994 | Shilo | 323/908 |

Primary Examiner—Steven L. Stephan
Assistant Examiner—Matthew V. Nguyen
Attorney, Agent, or Firm—Poms, Smith, Lande & Rose

[57] ABSTRACT

A circuit for limiting inrush current in a DC power supply is disclosed. The inrush limiting circuit should be placed between an input AC power line and a power supply input capacitor bank. A thermistor is located between the capacitor bank and the input diode bridge to limit the initial inrush current. Once the input capacitor bank is fully charged, an insulated-gate bipolar transistor or IGBT switches the rectified line voltage to a boost power factor correction converter circuit, which utilizes an inductor and diode along with a field effect transistor to boost the input to a high DC voltage. This high DC voltage blocks the thermistor through use of a diode and keeps it cold to maintain high resistance in case of a new off/on cycle. The IGBT can be replaced with a silicon control rectifier, a triac, or a field effect transistor.

18 Claims, 1 Drawing Sheet

APPARATUS FOR LIMITING INRUSH CURRENT

BACKGROUND OF THE INVENTION

1. Field of the Invention

The present invention relates to an inrush current limiter for a power supply. More precisely, the present invention relates to an inrush current limiter using a non-dissipative thermistor having a power factor correction circuit.

2. Prior Art and Related Information

In many power supplies, especially for computers, there are voltage and current limiters in order to suppress undesirable and spurious current and voltage spikes. Sometimes the voltage spikes are generated by electrical equipment using the same power line, other times the transient surges are caused by the power supply being quickly switched on and off or vice versa. Of course, there are numerous other causes for transient surges known in the art.

The inrush current should be suppressed to avoid damage to the power supply. For example, in many conventional power supplies, there is an input capacitor bank that charges when initially powered up. During this charge-up, the capacitor bank acts as a short circuit and does not limit input current. As a result, the inrush current may activate a circuit breaker or even overload a circuit near the power input.

To avoid this problem, most conventional power supplies include a device to limit the initial input current flowing into the circuit. In a typical low end power supply, in the 50 to 100 watt range, there is a thermistor in series with the input capacitor. As is known in the art, a thermistor is a resistive component having a high negative temperature co-efficient of resistance so that its resistance decreases as its temperature increases. During initial power-up, the thermistor is cold and the resistance is high thereby suppressing unwanted current transients. When the power supply is left on, the temperature of the thermistor rises and its resistance decreases, thus decreasing the energy losses.

In a larger power supply, a thermistor cannot be used because the current load may cause a catastrophic failure of the thermistor. Instead, the thermistor is replaced with a common resistor shunted by a triac or a silicon controlled rectifier (SCR). Using a conventional resistor in place of the thermistor is not completely desirable either. In particular, if the triac or SCR fails, several hundred watts of power is loaded on the resistor causing it to possibly explode, resulting in a catastrophic failure to the power supply.

Thermistors are not used in large power supplies also because they are not accurate devices. Specifically, after the thermistor has heated up, and if the power supply is turned off and on quickly, a transient surge in the current cannot be suppressed because the hot thermistor is still functioning with low resistance.

There have been other attempts at limiting the inrush current. For example, U.S. Pat. No. 3,947,751 to Bray discloses an electronic triac surge current limiting circuit. The circuit limits the inrush current on the AC line, but does not show a boost converter or a power factor boost converter. Bray uses a thermistor as known in the art to limit inrush current.

U.S. Pat. No. 5,122,724 to Criss discloses an inrush current limiter applicable only to low voltage DC to DC converters. Criss limits inrush current by modulating the drive to a field effect transistor (FET), which acts as a resistor during the transition from power off to on. This resistance limits the inrush current during turn on.

U.S. Pat. No. 4,719,553 to Hinckley discloses an inrush current limiter that uses relays for disabling the switching regulator during the initial turn-on phase of the power. There is no mention of use of a thermistor or like device.

U.S. Pat. No. 4,396,882 to Kellenbenz discloses a current limiting device that controls the maximum current or the peak current by limiting the current in a Darlington transistor. Kellenbenz relates to a regular input power supply and does not contemplate a boost DC to DC converter. Further, there is no use of a thermistor. It appears that no thermistor was used because the thermistor is effective only when it is cold, and if a thermistor is put in series with the line when the circuit is turned off and on again, the thermistor cannot perform its surge suppression because it is hot.

U.S. Pat. No. 4,628,431 to Kayser discloses a power supply on/off switching device with inrush current limiting circuitry. This device relates to regular current limiting on the AC line, and is not directed to a DC power supply.

SUMMARY OF THE INVENTION

In order to prevent catastrophic failure of power transistors and diodes, and to prevent tripping of input circuit breakers in a power supply, the present invention provides an apparatus for limiting inrush current in a DC power supply. The apparatus should be placed between the input power line and the power supply input capacitor bank.

In a preferred embodiment, the present invention provides a diode and a thermistor connected to the input alternating current source after a rectifier bridge. The thermistor limits the initial inrush current. Once the input capacitors are fully charged, a switching device such as an insulated-gate bipolar transistor (IGBT) switches the rectified line voltage to a boost power factor correction converter circuit that charges and regulates the capacitor bank at a given output DC voltage. This voltage blocks the thermistor's current because the diode is reverse biased and keeps the thermistor cold to maintain its high resistance. Thus, even after the power supply has been left on, a quick turn off and on might generate a current surge, which surge is suppressed by the cold thermistor. This quick off-on switching could be caused by any number of sources, yet the power supply remains protected.

In the preferred embodiment, the IGBT is open during the initial application of the input power to prevent the saturation of the power inductor, which is part of the boost power factor correction converter circuit. Saturation of the power inductor can cause a catastrophic failure to the switching transistors. The boost power factor correction converter circuit preferably comprises the inductor, a diode and an FET to amplify the output to a large DC voltage.

Accordingly, the present invention provides many advantages over the prior art devices. First, the present invention suppresses an inrush current upon initial power-up of the power supply. Second, the present invention may be incorporated into a high wattage power supply without risk of thermistor failure because of overload. Third, the present invention is also effective in suppressing an inrush current if the switching device, such as the IGBT, fails by passing the inrush current through the thermistor without the risk of catastrophic failure to the thermistor. Fourth, the inclusion of the boost power factor correction converter circuit improves the operating efficiency of the present invention. Other advantages can be seen from a reading of the following detailed description.

DETAILED DESCRIPTION OF THE PREFERRED EMBODIMENTS

Figure 1:
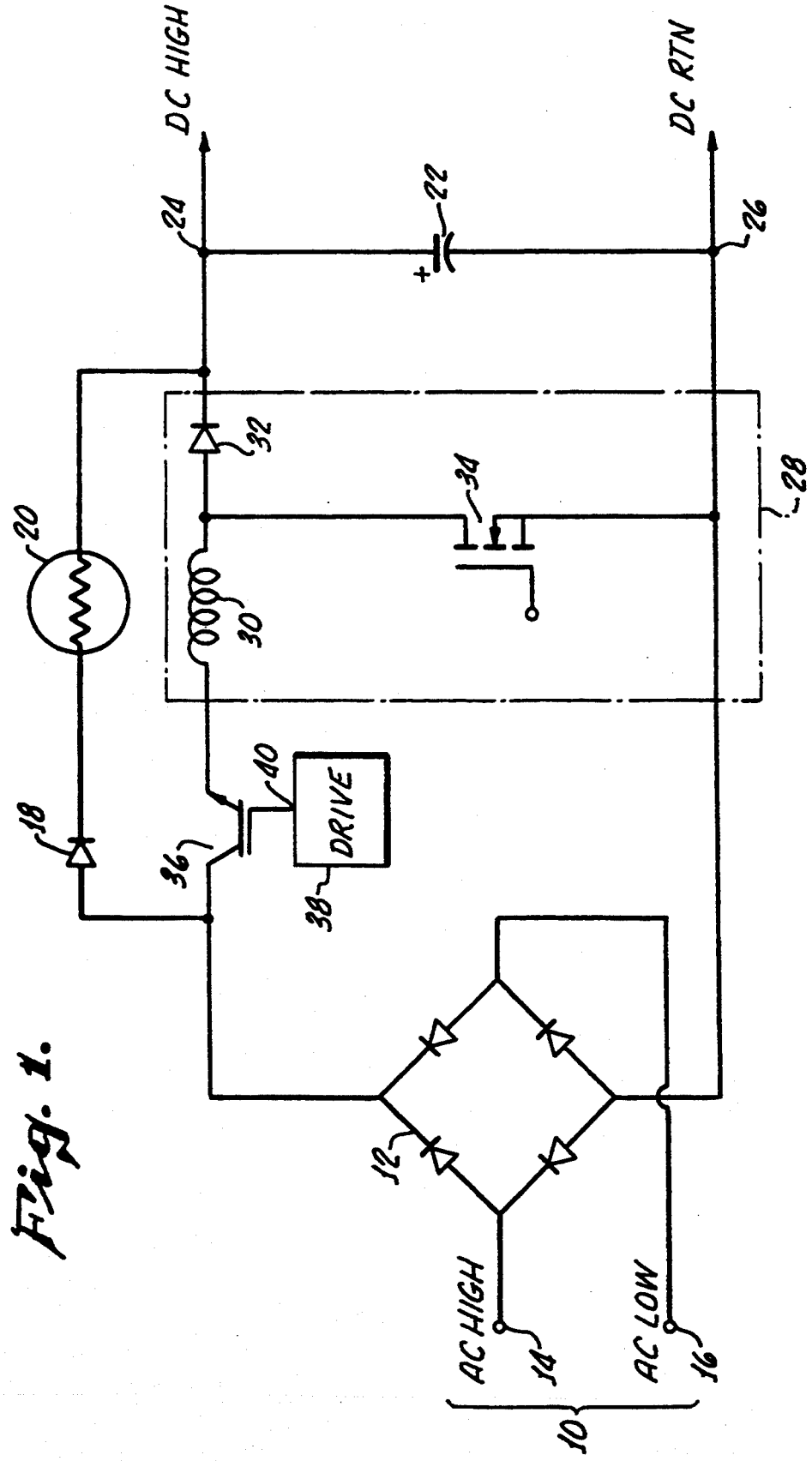

The following specification describes an apparatus for limiting inrush current in a power supply. In the description, specific materials and configurations are set forth in order to provide a more complete understanding of the present invention. But it is understood by those skilled in the art that the present invention can be practiced without those specific details. In some instances, well-known elements are not described precisely so as not to obscure the invention.

The present invention is preferably adapted to a DC power supply such as those used for a personal computer. The present invention apparatus for limiting inrush current can, of course, be adapted for use in other devices known in the art. Generally, the present invention converts an alternating current input to a high voltage DC rail, in the range of 375 volts DC, for example. The rest of the power supply operates from this high voltage DC rail.

In general, the present invention combines a thermistor with a switching device, preferably an insulated-gate bipolar transistor (IGBT), to work in combination with a boost power factor correction converter circuit to limit inrush current. The thermistor operates to suppress any current surges when the power supply is first turned on when the IGBT is not operating. When the IGBT is switched on, a diode in front of the thermistor near the AC input is reversed biased, thereby preventing current flow through the thermistor. The thermistor remains cold and maintains high resistance. Thus, if the AC input is turned off and on, current would flow through the thermistor line and the cold thermistor would suppress the surge. Thus, the present invention apparatus benefits from a thermistor, yet is capable of handling high power applications without fear of thermistor failure.

FIG. 1 is a schematic of a preferred embodiment of the present invention. In this circuit, an AC input is placed across terminals 14, 16, which lead to an input diode bridge 12. The input diode bridge 12 functions as a full wave rectifier, known in the art. The DC output of the input diode bridge 12 is connected preferably to a diode 18 with a thermistor 20 connected in series therewith. The output of the thermistor 20 is fed to a capacitor bank 22. As is known in the art, the capacitor bank 22 is used for smoothing or damping of the rectified input AC wave to obtain a cleaner DC output through terminals 24, 26.

As seen in FIG. 1, the output of the input diode bridge 12 is preferably fed to a boost power factor correction converter circuit 28. The boost power factor correction circuit 28 is used here because in power supplies that have a straight capacitor bank 22 at the output of the diode bridge 12, as here, there is a very high charging current during normal operation. Thus, for the same amount of power output, more current is needed to drive the power supply.

The boost power factor correction converter circuit 28 shown here is fairly standard in the computer power supply industry, and is used to correct this inefficiency. The circuit 28 typically includes the inductor 30 in series with a diode 32, and a field effect transistor 34. The power factor correction converter circuit 28 amplifies the input voltage to achieve the high DC voltage output.

Also at the output to the input diode bridge 12 is a switching device such as a transistor, preferably an insulated-gate bipolar transistor (IGBT) 36. The IGBT 36 is equivalent to a FET combined with a transistor, and is easy to drive. Functionally, the IGBT 36 acts as an instantaneous on/off switch for the present invention. A control circuit 38 connected to the gate 40 of the IGBT 36 determines the on/off state of the IGBT. The control circuit 38 is fairly well known in the art and need not be discussed in detail here.

The present invention circuit functions as follows. Initially, when the AC input 10 is turned on, the IGBT 36 is off, appearing as an open circuit. Current flows through the diode 18 and the thermistor 20 to charge the capacitor bank 22. During this time, the inrush current is suppressed by the thermistor 20.

After charging of the capacitor bank 22 has reached a predetermined level, the drive circuit 38 turns on the IGBT 36, causing the boost power factor correction converter circuit 28 to also operate. The boost power factor correction converter circuit 28 raises the input voltage to the high DC output voltage. At that point, the voltage at terminals 24, 26 is higher than the input voltage across the output of the diode bridge 12. Because of this higher voltage, the diode 18 is reverse biased, thereby blocking any current to the thermistor 20. Accordingly, the thermistor 20 ceases to operate and becomes cold.

The power supply continues to function normally, while the thermistor 20 is cold and inoperative throughout. In prior art circuits, the thermistor remains hot during normal operation and exhibits low resistance. Here, if a surge or a transient surge occurs, current again flows through the thermistor 20. The thermistor 20, however, is cold and exhibits high resistance to suppress the undesireable surge or transient surge. Incidentally, a surge refers to an input condition when the AC power is quickly turned off and on; a transient surge occurs when there is an inrush current.

It is important that the IGBT 36 or the switching device is initially in an off state to provide an open circuit condition so that the boost power factor correction converter circuit 28 is inoperative during the initial power on stage. Otherwise, the input current would not flow through the thermistor 20, and instead would flow through the closed IGBT 36 which acts as a short. The unsuppressed inrush current would then flow to the output terminals 24, 26 and damage any circuitry nearby, or activate an input fuse.

When the IGBT 36 is closed and the boost power factor correction converter circuit 28 is in operation, if the AC input 10 is shut off and on quickly, the IGBT 36 opens. Accordingly, any inrush current flows through the cold thermistor 20, which again prevents any surges or spikes from passing through the power supply.

Use of a negative temperature coefficient resistance such as the thermistor 20 is important due to the high wattages involved. For example, if a common resistor were used in place of the thermistor, and if the IGBT 36 were to fail and leave an open circuit, tremendous power would dissipate through the resistor thereby causing it to overheat or explode. Indeed, in a power supply that operates with several hundred watts power, the resistor would fail within 10 to 20 seconds. With a non-dissipative thermistor, the constant current therethrough would cause its resistance to drop, thus avoiding any catastrophic failure. The present invention therefore provides a fail-safe system of preventing any type of catastrophic failure seen in prior art devices.

It is preferable that the present invention rely on an IGBT 36 because it operates instantaneously. In alternative embodiments where a triac or a SCR might be used, there is a disadvantage. Specifically, neither device can be turned off immediately, but would continue to operate until the end of the AC cycle. If a SCR were used, for example, and the AC input were shut off and on quickly, the SCR which was in operation will not have shut off in response to the AC input being shut off. Thus, the quick off/on switching will not affect the SCR and it continues conducting. In such a scenario, the inrush current cannot be limited and passes through the power supply to cause internal damage, or to trip the input circuit breaker.

With an IGBT 36 as shown in FIG. 1, the IGBT turns off instantaneously when the AC input 10 is shut off, and remains off even if the AC input 10 is immediately turned back on, thereby redirecting the current through the thermistor 20. In this case, any inrush current is suppressed by the thermistor 20. Nonetheless, the IGBT for most purposes may be replaced by a SCR, a triac, a FET, a transistor, or some similar switching device known in the art. Although FIG. 1 shows an IGBT, those other devices can be used and the circuitry remains substantially similar to that shown. Any modifications to the circuit shown in FIG. 1 to accommodate those devices is well known in the art and need not be discussed in further detail here. The boost power factor correction converter circuit 28 preferably uses a FET 34 to boost the voltage at terminals 24, 26 in order to obtain the reverse bias discussed above. Such a boost power factor correction converter circuit 28 can be found in commercial power supplies in the 250- to 3000-watt range. It is understood by those skilled in the art the foregoing descriptions are preferred embodiments of the disclosed device and that various changes and modifications may be made to the invention without departing from the spirit and scope thereof.

What is claimed is:

1. An apparatus for limiting inrush current in a power supply connected to an input alternating current source and a load, the apparatus comprising:
   a rectifier connected across the input alternating current source;
   a threshold voltage controller connected to the rectifier;
   a negative temperature coefficient resistance connected to the threshold voltage controller and the load;
   a selectively activated conductive device connected to the threshold voltage controller, the rectifier, and the load; and
   a boost power factor correction converter circuit connected across the input alternating current source, in series with the selectively activated conductive device and in parallel with the threshold voltage controller.

2. The apparatus for limiting inrush current according to claim 1, wherein the boost power factor correction converter circuit further comprises an inductor and a diode in series with the selectively activated conductive device, and a field effect transistor connected across the selectively activated conductive device.

3. The apparatus for limiting inrush current according to claim 1, wherein the threshold voltage controller further comprises a diode.

4. The apparatus for limiting inrush current according to claim 1, wherein the selectively activated conductive device further comprises a field effect transistor.

5. The apparatus for limiting inrush current according to claim 1, wherein the selectively activated conductive device further comprises an insulated-gate bipolar transistor.

6. The apparatus for limiting inrush current according to claim 1, wherein the selectively activated conductive device further comprises a silicon controlled rectifier.

7. The apparatus for limiting inrush current according to claim 1, wherein the selectively activated conductive device further comprises a transistor.

8. The apparatus for limiting inrush current according to claim 1, wherein the negative temperature coefficient resistance further comprises a thermistor.

9. The apparatus for limiting inrush current according to claim 1, wherein the selectively activated conductive device further comprises a triac.

10. An apparatus for limiting inrush current in a power supply, connected to an input alternating current source and a load, the apparatus comprising:
    a diode and a negative temperature coefficient resistance connected to the input alternating current source and the load;
    a switching device connected to the input alternating current, the load, and the negative temperature coefficient resistance;
    a drive circuit controlling the switching device; and
    a boost power factor correction converter circuit connected across the input alternating current source, in series with the switching device and in parallel with the threshold voltage controller.

11. The apparatus for limiting inrush current according to claim 10, wherein the apparatus further comprises a rectifier bridge connected across the input alternating current source.

12. The apparatus for limiting inrush current according to claim 10, wherein the switching device further comprises an insulated-gate bipolar transistor.

13. The apparatus for limiting inrush current according to claim 10, wherein the boost power factor correction converter circuit further comprises an inductor, a diode, and a field effect transistor.

14. The apparatus for limiting inrush current according to claim 10, wherein the switching device further comprises a field effect transistor.

15. An apparatus for limiting inrush current in a power supply, connected to an input alternating current source and a load, the apparatus comprising:
    a rectifier bridge connected across the input alternating current source;
    a diode and a thermistor connected to the input alternating current source and the load;
    a switching device having three leads, wherein the first lead is connected to the rectifier bridge;
    an inductor and a diode connected in series with the second lead of the switching device and the load and in parallel with the thermistor;
    a drive circuit connected to the third lead of the switching device;

a field effect transistor connected across the rectifier bridge; and a capacitor connected across the load.

16. The apparatus for limiting inrush current according to claim 15, wherein the switching device further comprises a transistor.

17. The apparatus for limiting inrush current according to claim 15, wherein the switching device further comprises an insulated-gate bipolar transistor.

18. The apparatus for limiting inrush current according to claim 15, wherein the switching device further comprises a field effect transistor.

* * * * *